United States Patent Office 3,073,636  
Patented Jan. 15, 1963

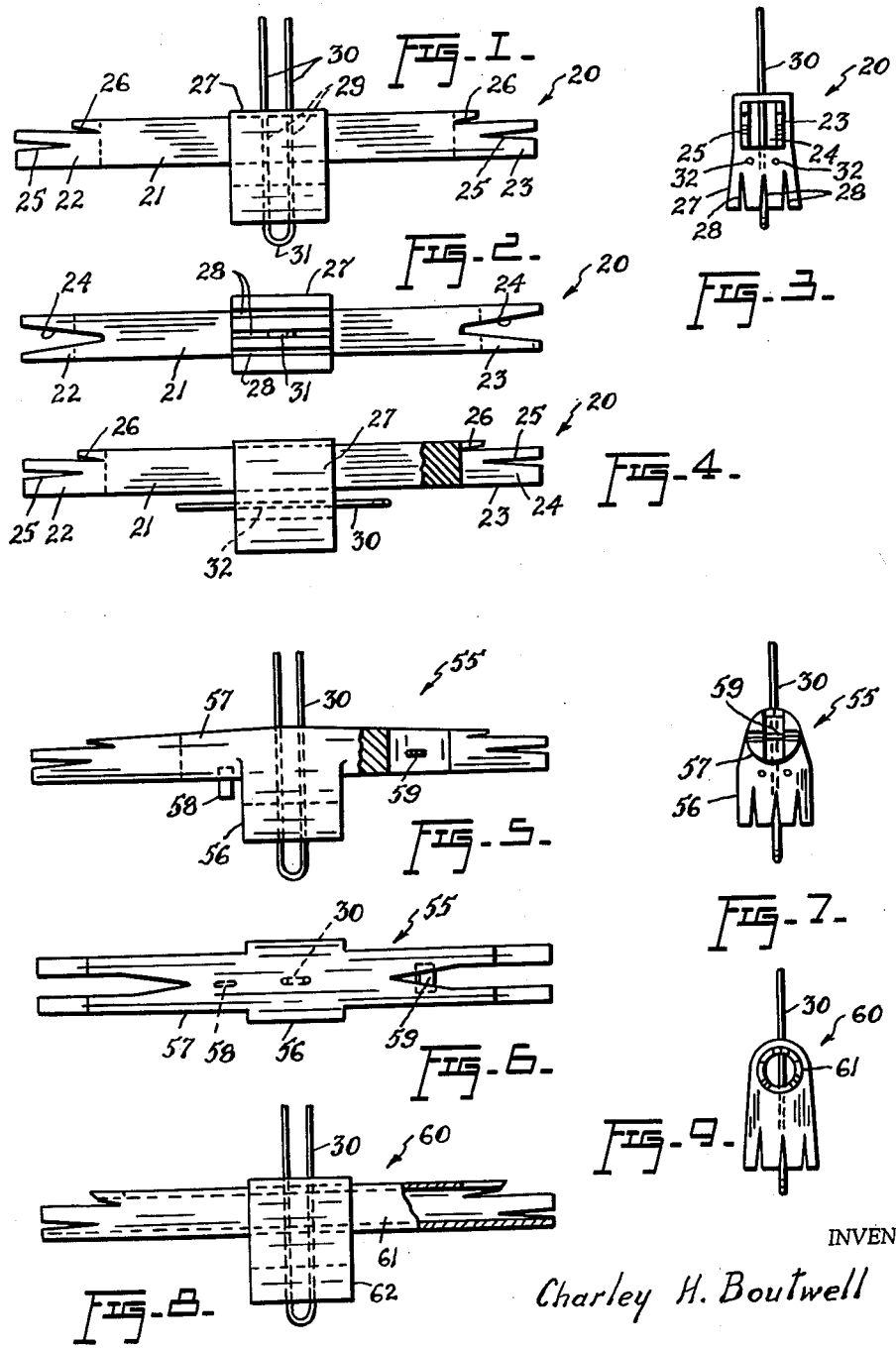

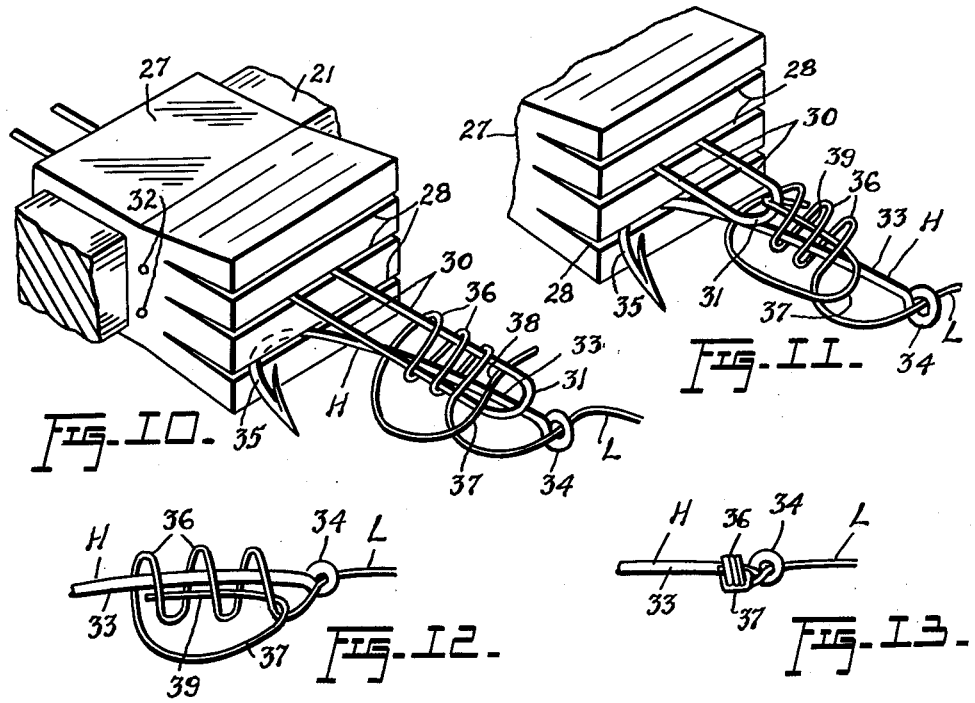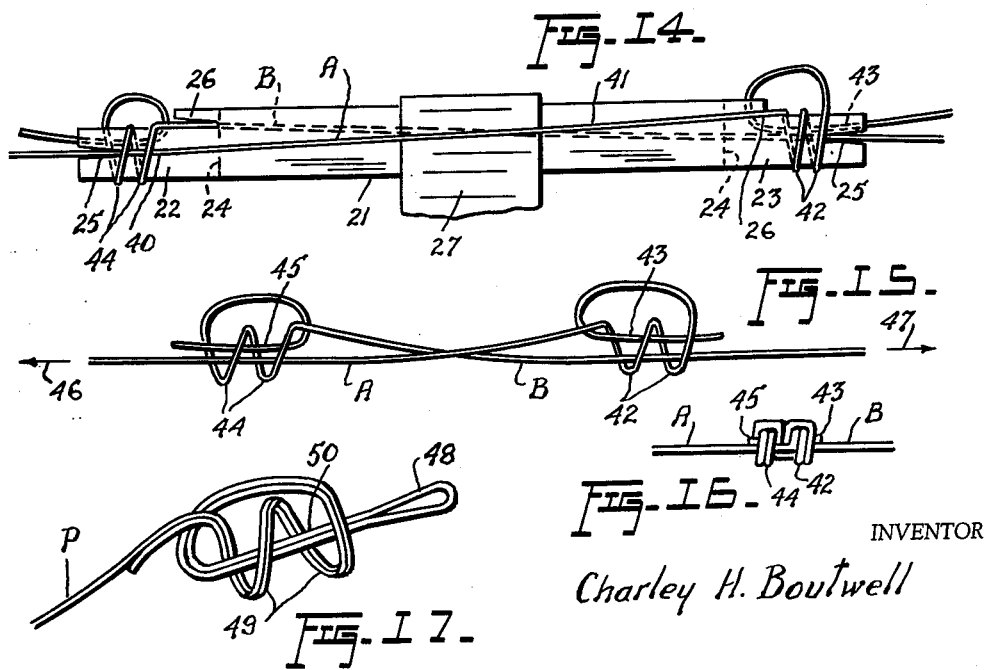

3,073,636  
KNOT TYING DEVICES  
Charley H. Boutwell, R.R. 3, Elida, Ohio  
Filed Dec. 6, 1960, Ser. No. 74,095  
5 Claims. (Cl. 289—17)

This invention relates to new and useful improvements in devices for tying knots, and while as such the invention may be used in various different environments, it is particularly intended for use by fishermen when tying knots in fishing lines, leaders, and the like.

The principal object of the invention is to facilitate tying of knots in lines in a simple, expeditious and secure manner, the invention providing means for tying a leader to a hook, splicing two lines, forming a loop on a leader, and similar other line tying operations.

Some of the advantages of the invention reside in its simplicity of construction, convenient and efficient use, and in its adaptability to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of a knotter or a knot tying device in accordance with the invention;

FIGURE 2 is an underside plan view thereof;

FIGURE 3 is an end view of the same;

FIGURE 4 is a side elevational view, partly in section, showing the device with its U-shaped mandrel or clutch in a storage position;

FIGURE 5 is a side elevational view, partly in section, of a modified embodiment of the invention;

FIGURE 6 is a top plan view of the embodiment of FIGURE 5;

FIGURE 7 is an end view of the embodiment of FIGURES 5 and 6;

FIGURE 8 is a side elevational view, partly in section, of another modified embodiment;

FIGURE 9 is an end view of the embodiment of FIGURE 8;

FIGURE 10 is a fragmentary enlarged perspective view showing one step in tying a leader to a hook;

FIGURE 11 is a fragmentary view, similar to FIGURE 10 and showing another step in tying a leader to a hook;

FIGURE 12 is a fragmentary view of a hook with the leader tied thereto, the convolutions of the leader being spaced apart to illustrate the manner in which the knot is tied;

FIGURE 13 is a fragmentary view of a hook and leader with the finished knot;

FIGURE 14 is a fragmentary enlarged elevational view showing the manner of splicing two lines;

FIGURE 15 is an illustration of the two lines with spaced apart convolutions to illustrate the manner in which they are tied;

FIGURE 16 is an illustration of the completed splice; and

FIGURE 17 is a perspective view showing how a leader loop may be tied with the invention.

Referring now to the accompanying drawings in detail, particularly to FIGURES 1–4 inclusive, the knot tying device or knotter in accordance with the invention is designated generally by the reference numeral 20 and embodies in its construction an elongated body or mandrel 21 having a pair of end portions 22, 23 provided with V-shaped slots 24 which are open at the upper and lower surfaces and at the ends of the mandrel, as shown. The end portions 22, 23 are also provided at opposite sides of the slots 24 with pairs of line anchoring notches 25, 26.

A block or body 27, which is preferably of resilient material such as hard rubber, or the like, is mounted intermediate the ends of the mandrel 21 and projects downwardly therefrom, its lower portion being provided with a set of spaced parallel, upwardly extending, tapered slits 28.

The block 27 and the mandrel 21 are formed with a pair of vertical bores 29 which slidably receive therein the side portions of a U-shaped mandrel or clutch 30, the bight portion of the latter being indicated at 31. The bores 29 are in alignment with the central of the slits 28 and when the clutch 30 is slid upwardly in the bores, its bight portion 31 enters the central slit. The block 27 is also formed with a pair of transversely extending bores 32 in which the clutch 30 may be inserted when it is not in use, as illustrated in FIGURE 4.

Referring now to FIGURES 10–13, a procedure of tying a leader L to a fish hook H is illustrated. The hook H includes the usual shank 33, eye 34 and bill portion 35, and as the first step in the procedure, the bill portion 35 of the hook is inserted in one of the side slits 28 of the block 27 so that the shank 33 projects outwardly therefrom. The leader L is then passed through the eye 34 and with the clutch or mandrel 30 disposed alongside the shank of the hook, the leader is given a few turns or convolutions around both the mandrel 30 and the hook shank 33, as indicated at 36. The end portion 37 of the leader is then brought at the outside of the convolutions 36 toward the bight portion 31 of the mandrel 30 and is inserted into the bight portion as indicated at 38. Thereupon, the mandrel 30 is slid upwardly in the bores 29 while the convolutions 36 are held by fingers against sliding with the mandrel, so that the bight portion 31 of the mandrel causes the end portion 38 of the leader to be drawn into the convolutions, as indicated at 39. The leader is then pulled so as to tighten the convolutions 36 around the hook shank 33 and around the leader portion 38 while the hook H is removed from the slit 28 and the convolutions 36 are slipped off the mandrel 30, thus producing a tied connection of the leader to the hook as shown in FIGURE 13. Any excess length of the leader portion 38 projecting through the convolutions 36 may, of course, be cut off.

FIGURES 14–16 illustrate a procedure of tying together or splicing two separate lines A and B. In this instance, one of the lines, for example, the line A, is anchored in the notch 25 at one side of the end portion 22 of the mandrel 21 as indicated at 40 in FIGURE 14 and the line is led along the outside of the mandrel as at 41 for anchoring in the notch 26 of the mandrel end portion 23. Similarly, the line B is anchored in the notch 25 at the opposite side of the mandrel portion 23 and taken along that side of the mandrel for anchoring in the notch 26 of the mandrel portion 22. The end portion of the line A is then wound around the mandrel portion 23 so as to produce the convolutions 42 which also encompass the line B passing at the outside of the portion 23, and the end portion of the line A is then brought into the slot 24 in the portion 23 and passed through the convolutions 42 as shown at 43. A similar procedure is repeated at the other end portion 22 of the mandrel by winding the line B around the same as at 44 and passing the end portion of the line B through the convolutions 44 as at 45, it being noted that the convolutions 44 also encompass the line A, as is clearly shown in FIGURE 15. Upon releasing the lines A and B from the notches 25, 26 and slipping the convolutions 42, 44 off the mandrel portions 23, 22, the lines A and B will be in the form shown in FIGURE 15 and by pulling them in opposite directions as shown by the arrows 46, 47 the convolutions will be drawn together and tightened so as to produce the finished splice shown in FIGURE 16. Of course, any excessive length of the line end portions 43, 45 may be cut off.

FIGURE 17 illustrates the manner of tying a loop at the end of a leader P, an end portion of which has been doubled upon itself to form the loop 48. By using either one of the mandrel portions 22, the doubled portion of the leader is wound around the same in the same manner as already described, for example, in connection with the line A in FIGURE 14, so that the doubled leader portion is formed with the convolutions 49. The looped end of the leader is then passed through the convolutions as indicated at 50 and the knot is subsequently tightened to secure the finished loop.

FIGURES 5-7 illustrate a somewhat modified embodiment of the knotter which is designated by the general reference numeral 55 and is much the same as the embodiment 20 with exception that the block 56 is formed integrally with the mandrel 57 and the mandrel is substantially cylindrical rather than rectangular in cross-section. Suitable cutter blades 58, 59 may be provided on the mandrel to facilitate cutting off of excess lengths of lines or leaders, if so desired.

Another modified embodiment 60 shown in FIGURES 8 and 9 is similar to the embodiments 20 and 55 and includes a hollow, tubular mandrel 61 equipped with the block 62, the hollow interior of the mandrel affording a storage space for the clutch 30 when the latter is not in use.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, such as may lie within the spirit and scope of the invention as claimed.

What is claimed as new is:

1. In a device for tying a knot in a line for connecting the same to a hook having a shank with a bill at one end and an eye at the other end of said shank, the combination of a block formed from resilient rubber-like material, said block having a side wall provided with a transverse slit for receiving and frictionally gripping the bill of a hook with the hook shank projecting outwardly from said block, said block also being provided with a pair of spaced parallel and open-ended bores extending from said side wall to the relatively opposite side of the block, and a U-shaped mandrel including a bight portion and a pair of leg portions, said leg portions being slidably disposed in said bores with said bight portion located adjacent the eye of a hook held in said slit, whereby a line passing through the hook eye may be wound in convolutions around the mandrel and the hook and an end portion of the line engaged with the bight portion of the mandrel to be drawn through the convolutions when the leg portions of the mandrel are slid inwardly in said bores.

2. The device as defined in claim 1 wherein said slit in said block has a relatively wide entrance at said side wall of the block and is tapered inwardly therefrom.

3. A knotter for tying knots in fishing tackle, said knotter comprising an elongated member having a pair of free end portions, a block of resilient rubber-like material mounted on the center portion of said elongated member and projecting laterally to one side thereof, said block having an outer side wall provided with a transverse slit for receiving and frictionally gripping the bill of a fish hook with the hook shank projecting outwardly from the block, said block also being provided with a pair of spaced parallel and open-ended bores extending from said outer side wall through the block and through the center portion of said elongated member to the relatively opposite side of the block, and a U-shaped mandrel including a bight portion and a pair of leg portions, said leg portions being slidably disposed in said bores with said bight portion located adjacent the eye of a fish hook held in said slit whereby a line passing through the hook eye may be wound in convolutions around said mandrel and hook and an end portion of the line engaged with the bight portion of the mandrel to be drawn through the convolutions when the leg portions of the mandrel are slid inwardly in said bores, the free end portions of said elongated member being provided with slots open at the free ends and at opposite sides of the elongated member whereby a line tied to a hook held by said block may be passed through the slot in one end portion of the elongated member and wound in convolutions around another line passed through the slot in the other end portion of the elongated member with an end portion of the hook tied line passed through the last mentioned convolutions for tying the first and second mentioned lines together.

4. The device as defined in claim 3 wherein said block is formed integrally with said elongated member.

5. The device as defined in claim 3 wherein said block is formed separately from said elongated member and is mounted in position thereon, the leg portions of said mandrel passing through said block and said elongated member assisting to retain the former in position on the latter.

References Cited in the file of this patent

UNITED STATES PATENTS

| | | |
|---|---|---|
| 776,271 | Thomasson | Nov. 29, 1904 |
| 2,498,920 | Holland | Feb. 28, 1950 |
| 2,502,751 | Roberts | Apr. 4, 1950 |
| 2,601,605 | Fulvio | June 24, 1952 |
| 2,697,624 | Thomas et al. | Dec. 21, 1954 |
| 2,700,840 | Butts | Feb. 1, 1955 |
| 2,716,036 | Fenell | Aug. 23, 1955 |
| 2,758,858 | Smith | Aug. 14, 1956 |
| 2,934,369 | Kennedy | Apr. 26, 1960 |